US012675895B2

(12) United States Patent
Nakamura

(10) Patent No.: US 12,675,895 B2
(45) Date of Patent: Jul. 7, 2026

(54) MONITORING SYSTEM, MONITORING APPARATUS, AND MONITORING METHOD

(71) Applicant: NEC Corporation, Tokyo (JP)

(72) Inventor: Tsubasa Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 315 days.

(21) Appl. No.: 18/484,952

(22) Filed: Oct. 11, 2023

(65) Prior Publication Data

US 2024/0135562 A1 Apr. 25, 2024
US 2024/0233155 A9 Jul. 11, 2024

(30) Foreign Application Priority Data

Oct. 24, 2022 (JP) ................................. 2022-169898

(51) Int. Cl.
*G06T 7/521* (2017.01)
*G06T 3/60* (2024.01)
(52) U.S. Cl.
CPC ................ *G06T 7/521* (2017.01); *G06T 3/60*
(2013.01); *G06T 2207/10028* (2013.01); *G06T*
*2207/30184* (2013.01)
(58) Field of Classification Search
CPC . G06T 7/521; G06T 3/60; G06T 2207/10028;
G06T 2207/30184
See application file for complete search history.

(56) References Cited

U.S. PATENT DOCUMENTS

2023/0221410 A1* 7/2023 Sakata .................... G01S 17/89
382/106

FOREIGN PATENT DOCUMENTS

JP 2022-510345 A 1/2022
WO WO-2020109603 A1 * 6/2020 ............... B64F 1/36
WO 2021/199609 A1 10/2021

OTHER PUBLICATIONS

ScienceWorld, What is a mirage?, https://www.youtube.com/watch? v=stUG318GyKQ, Feb. 17, 2021 (Year: 2021).*
Baraja, Effective Range and why it matters more than Maximum Range, https://www.baraja.com/en/blog/effective-range-matters-more-than-maximum-range, Mar. 30, 2021 (Year: 2021).*
Zhao, Robust Normal Estimation for 3D LiDAR Point Clouds in Urban Environments, Sensors 2019, 19, 1248; doi: 10.3390/ s19051248 (Year: 2019).*

* cited by examiner

*Primary Examiner* — Vu Le
*Assistant Examiner* — Lei Zhao
(74) *Attorney, Agent, or Firm* — Sughrue Mion, PLLC

(57) ABSTRACT
Three-dimensional data acquisition means acquires three-dimensional data output from a three-dimensional ranging sensor for scanning a paved surface for aircraft using laser light. Extraction means extracts, from the three-dimensional data, real image data about a real image present on the paved surface and mirage image data about a mirage image corresponding to the real image. Foreign object detection means detects a foreign object left on the paved surface using the real image data and the mirage image data.

12 Claims, 9 Drawing Sheets

MONITORING SYSTEM, MONITORING APPARATUS, AND MONITORING METHOD

INCORPORATION BY REFERENCE

This application is based upon and claims the benefit of priority from Japanese patent application No. 2022-169898, filed on Oct. 24, 2022, the disclosure of which is incorporated herein in its entirety by reference.

TECHNICAL FIELD

The present disclosure relates to a monitoring system, a monitoring apparatus, and a monitoring method.

BACKGROUND ART

When operating facilities for aircraft, represented by airports, it is important to closely inspect paved surfaces for aircraft, such as runways, taxiways, and parking areas, because there are cases where foreign objects are left on such paved surfaces. These foreign objects can range from relatively large items like animal carcasses, to relatively small ones like tools used for aircraft maintenance, and even tiny fragments like parts that have detached from aircraft or patrol vehicles. These foreign objects can cause tires on aircraft to burst, or if ingested into jet engines, result in severe damage thereto. To avoid such situations, airport personnel must regularly patrol the paved surfaces to find and remove foreign objects. However, the paved surfaces are extensive and thus conducting the above regular patrols incurs significant costs.

Published Japanese Translation of PCT International Publication for Patent Application, No. 2022-510345 discloses an airport maintenance apparatus equipped with a detection unit including a Lidar scanner and an X-ray camera, that autonomously travels on runways. When a foreign object is detected by the detection unit, the airport maintenance apparatus eliminates or retrieves the foreign object.

In the configuration of Published Japanese Translation of PCT International Publication for Patent Application, No. 2022-510345 described above, since the airport maintenance apparatus is required to patrol the runway, the aircraft maintenance apparatus itself could potentially interfere with aircraft takeoffs and landings. Therefore, the airport maintenance apparatus can patrol the paved surface only when aircraft takeoffs and landings are not taking place. However, in an airport where the aircraft takeoffs and landings occur frequently and the time between them is short, it becomes difficult for the airport maintenance apparatus to have sufficient time between takeoffs and landings to patrol the runway.

Therefore, the present inventors have considered using a three-dimensional ranging sensor based on laser light to inspect paved surfaces. A three-dimensional ranging sensor using laser light typically outputs three-dimensional point cloud data or three-dimensional polygon data as scanning results. However, when the above-mentioned foreign objects are far away from the three-dimensional ranging sensor, sufficient data that can enable a foreign object to be retrieved cannot be obtained.

SUMMARY

An object the present disclosure is to improve the technique for detecting a foreign object left on a paved surface for aircraft.

According to a first example aspect of the present disclosure, a monitoring system includes:

three-dimensional data acquisition means for acquiring three-dimensional data output from a three-dimensional ranging sensor for scanning a paved surface for aircraft using laser light;

extraction means for extracting, from the three-dimensional data, real image data about a real image present on the paved surface and mirage image data about a mirage image corresponding to the real image; and foreign object detection means for detecting a foreign object left on the paved surface using the real image data and the mirage image data.

According to a second example aspect of the present disclosure, a monitoring apparatus comprising:

three-dimensional data acquisition means for acquiring three-dimensional data output from a three-dimensional ranging sensor for scanning a paved surface for aircraft using laser light;

extraction means for extracting, from the three-dimensional data, real image data about a real image present on the paved surface and mirage image data about a mirage image corresponding to the real image; and foreign object detection means for detecting a foreign object left on the paved surface using the real image data and the mirage image data.

According to a third example aspect of the present disclosure, a monitoring method executed by a computer includes:

acquiring three-dimensional data output from a three-dimensional ranging sensor for scanning a paved surface for aircraft using laser light;

extracting, from the three-dimensional data, real image data about a real image present on the paved surface and mirage image data about a mirage image corresponding to the real image; and detecting a foreign object left on the paved surface using the real image data and the mirage image data.

BRIEF DESCRIPTION OF DRAWINGS

The above and other aspects, features, and advantages of the present disclosure will become more apparent from the following description of certain example embodiments when taken in conjunction with the accompanying drawings, in which.

EXAMPLE EMBODIMENT

Summary of the Present Disclosure

Figure 1:
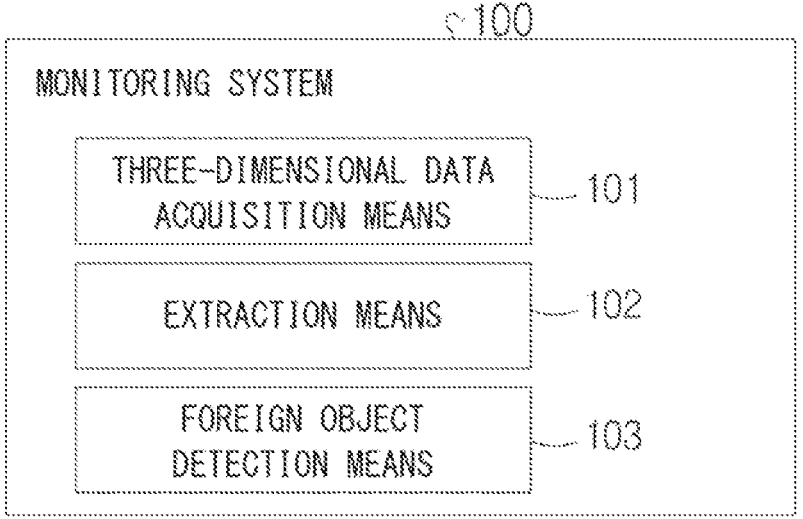
FIG. 1 is a functional block diagram of a monitoring system.

An outline of a monitoring system of the present disclosure will be described below with reference to FIG. 1. FIG. 1 is a functional block diagram of the monitoring system.

As shown in FIG. 1, a monitoring system 100 includes three-dimensional data acquisition means 101, extraction means 102, and foreign object detection means 103.

The three-dimensional data acquisition means 101 acquires three-dimensional data output from a three-dimensional ranging sensor that scans paved surfaces for aircraft using laser light.

The extraction means 102 extracts real image data about a real image present on the paved surface and mirage image data about a mirage image of the real image from the three-dimensional data.

The foreign object detection means 103 detects a foreign object left on the paved surface using the real image data and the mirage image data.

According to the above configuration, since an amount of data to be used for the foreign object detection becomes large, the detection of the foreign object left on the paved surface for aircraft is improved.

First Embodiment

Next, a first example embodiment of the present disclosure will be described with reference to FIGS. 2 to 7.

Figure 2:
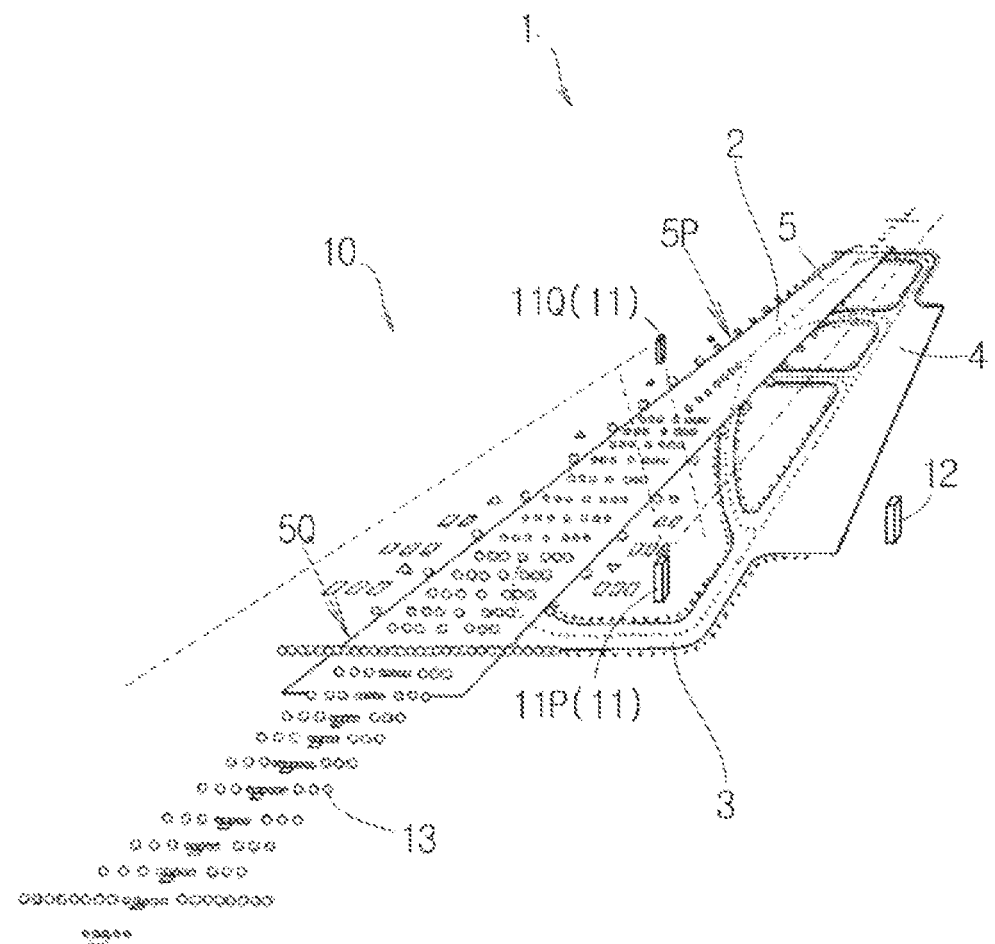
FIG. 2 is a bird's eye view of an airport.

FIG. 2 shows a bird's eye view of an airport 1. As shown in FIG. 2, the airport 1 is mainly provided with a runway 2, a taxiway 3, and a parking area 4.

The length of the runway 2 is typically 2000 to 4000 meters. The width of the runway 2 is typically 30 to 60 meters.

The airport 1 is provided with a monitoring system 10 for monitoring the runway 2, the taxiway 3, and the parking area 4. The monitoring system 10 includes a plurality of three-dimensional LiDAR scanners 11 and a monitoring apparatus 12.

In this example embodiment, the plurality of three-dimensional LiDAR scanners 11 include a first three-dimensional LiDAR scanner 11P and a second three-dimensional LiDAR scanner 11Q. The first three-dimensional LiDAR scanner 11P monitors a first paved surface 5P which is distant from a plurality of approach lights 13 within the paved surface 5 of the extensive runway 2. The second three-dimensional LiDAR scanner 11Q monitors a second paved surface 5Q which is near the plurality of approach lights 13 within the paved surface 5 of the extensive runway 2. The first paved surface 5P and the second paved surface 5Q constitute the paved surface 5 of the runway 2. Hereinafter, mainly the monitoring of the first paved surface 5P using the first three-dimensional LiDAR scanner 11P will be described. As for the monitoring of the second paved surface 5Q using the second three-dimensional LiDAR scanner 11Q, the description is omitted due to redundancy.

In this example embodiment, each three-dimensional LiDAR scanner 11 employs a ToF (Time Of Flight) method as a distance measuring technique. However, instead of this, each three-dimensional LiDAR scanner 11 may use an FMCW (Frequency Modulated Continuous Wave) method or an AMCW (Amplitude-modulated Continuous Wave) method as a distance measuring technique. The FMCW method or the AMCW method may be referred to as an indirect ToF method.

The higher the installation height of each three-dimensional LiDAR scanner 11, the more advantageous it is for monitoring the paved surface 5. However, the installation height of each three-dimensional LiDAR scanner 11 is strictly limited by the Civil Aeronautics Law. The installation height of each three-dimensional LiDAR scanner 11 is typically 2 to 5 meters.

Each three-dimensional LiDAR scanner 11 is typically installed fixedly on the premises of the airport 1. In other words, each three-dimensional LiDAR scanner 11 is non-vehicle-mounted. However, alternatively, each three-dimensional LiDAR scanner 11 may be portable. That is, each three-dimensional LiDAR scanner 11 may be vehicle-mounted. However, each three-dimensional LiDAR scanner 11 is configured to perform scanning while stationary relative to a space.

Figure 3:
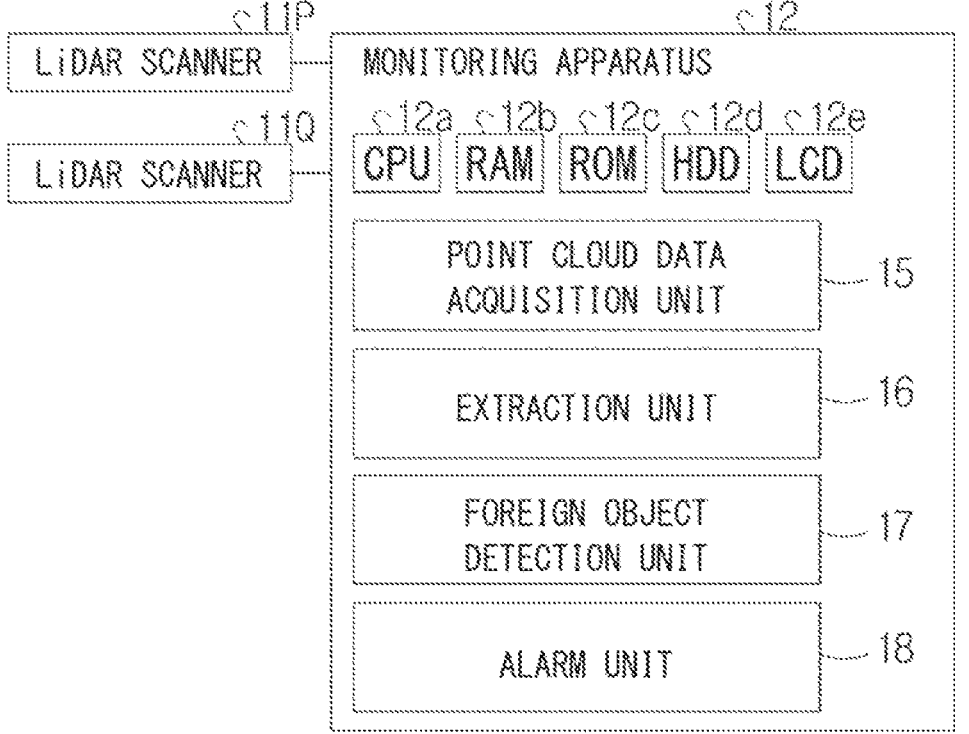
FIG. 3 is a functional block diagram of a monitoring apparatus.

As shown in FIG. 3, the first three-dimensional LiDAR scanner 11P and the second three-dimensional LiDAR scanner 11Q can bidirectionally communicate with the monitoring apparatus 12. The monitoring apparatus 12 includes a CPU 12a(Central Processing Unit) as a central processing unit. The monitoring apparatus 12 includes an RAM12b (Random Access Memory) for reading and writing operations. The monitoring apparatus 12 further includes a read-only ROM 12c (Read Only Memory). The monitoring apparatus 12 also includes an HDD 12d (Hard disk drive) as an external storage apparatus and an LCD12e (Liquid crystal display) as display means.

The CPU 12a reads and executes a control program stored in the ROM 12c and the HDD 12d. Thus, the control program functions hardware such as the CPU 12a as a point cloud data acquisition unit 15, an extraction unit 16, a foreign object detection unit 17, and an alarm unit 18.

The point cloud data acquisition unit 15 acquires three-dimensional data output from a three-dimensional ranging sensor that scans a paved surface for aircraft using laser light. Details of this processing is described below.

The point cloud data acquisition unit 15 acquires three-dimensional data outputted from the first three-dimensional LiDAR scanner 11P for scanning the first paved surface 5P using laser light. The first three-dimensional LiDAR scanner 11P is a specific example of a three-dimensional ranging sensor. The paved surface for aircraft may be at least one of the runway 2, the taxiway 3, the parking area 4, and a heliport (not shown).

The three-dimensional data is typically point cloud data represented in an XYZ coordinate system. The first three-dimensional LiDAR scanner 11P may output the point cloud data. Alternatively, the three-dimensional data may be point cloud data represented in a polar coordinate system. In this case, the point cloud data acquisition unit 15 converts the point cloud data output from the first three-dimensional LiDAR scanner 11P into an XYZ coordinate system. In this example embodiment, the first three-dimensional LiDAR scanner 11P is disposed away from the monitoring apparatus 12. However, the monitoring apparatus 12 may include the first three-dimensional LiDAR scanner 11P. The three-dimensional data may be polygon data instead of point cloud data.

Figure 4:
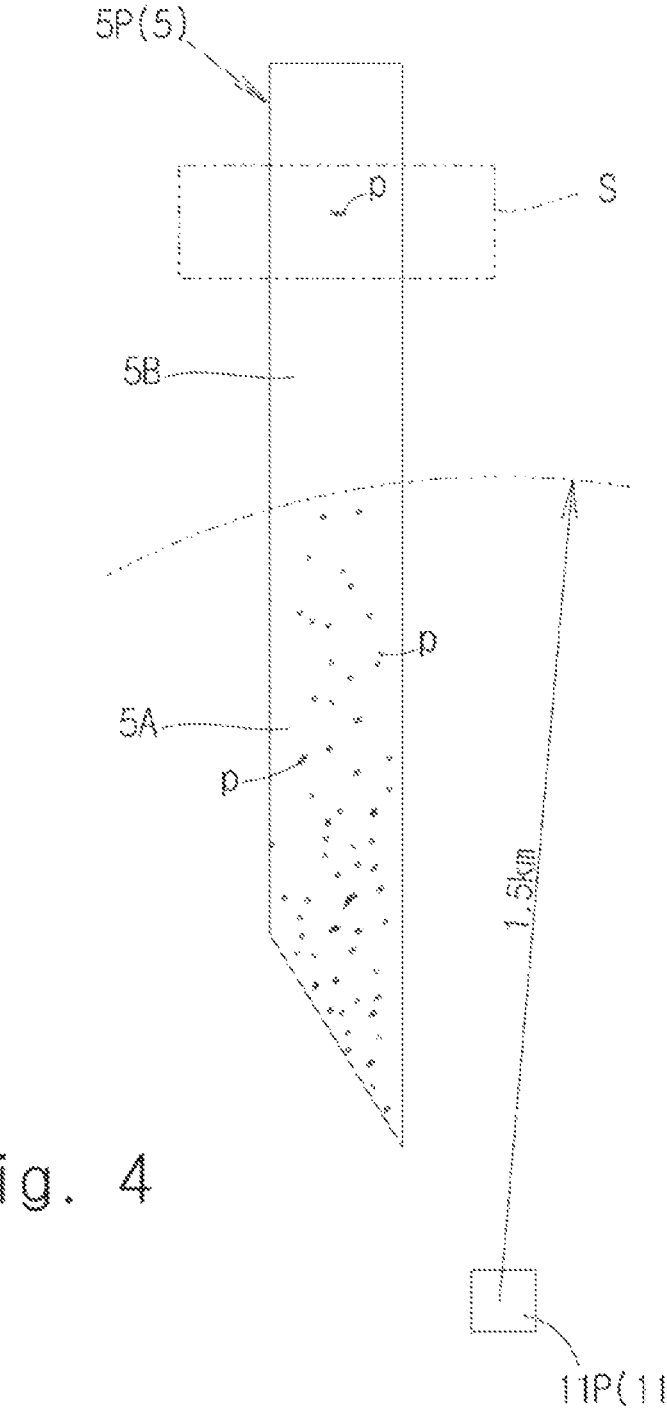
FIG. 4 is a plan view visualizing point cloud data.

FIG. 4 shows a plan view visualizing a plurality of measuring points p constituting point cloud data output from the first three-dimensional LiDAR scanner 11P. As shown in FIG. 4, within the first paved surface 5P, on a paved surface 5A whose the distance from the first three-dimensional LiDAR scanner 11P is less than a predetermined value (hereinafter, "nearby paved surface 5A), a large number of measuring points p corresponding to the nearby paved surface 5A are generated on the nearby paved surface 5A. Accordingly, within the first paved surface 5P, the nearby paved surface 5A can be measured by the first three-dimensional LiDAR scanner 11P. The predetermined value is typically 1.5 km.

In contrast, within the first paved surface 5P, a paved surface 5B which is distant from the first three-dimensional LiDAR (hereafter, "distant paved surface 5B"), and whose distance from the first three-dimensional LiDAR scanner 11P is greater than or equal to the predetermined value, does not have any measuring points corresponding to it generated. This is because the backscattered light from the laser beam irradiated by the first three-dimensional LiDAR scanner 11P onto the distant paved surface 5B is weak, and the light-receiving elements of the first three-dimensional LiDAR scanner 11P cannot detect this backscattered light. Therefore, the distant paved surface 5B is a part of the first paved surface 5P positioned farther from the first three-dimensional LiDAR scanner 11P than the nearby paved surface 5A is, and it is a surface that cannot be measured for distance by the first three-dimensional LiDAR scanner 11P.

Figure 5:
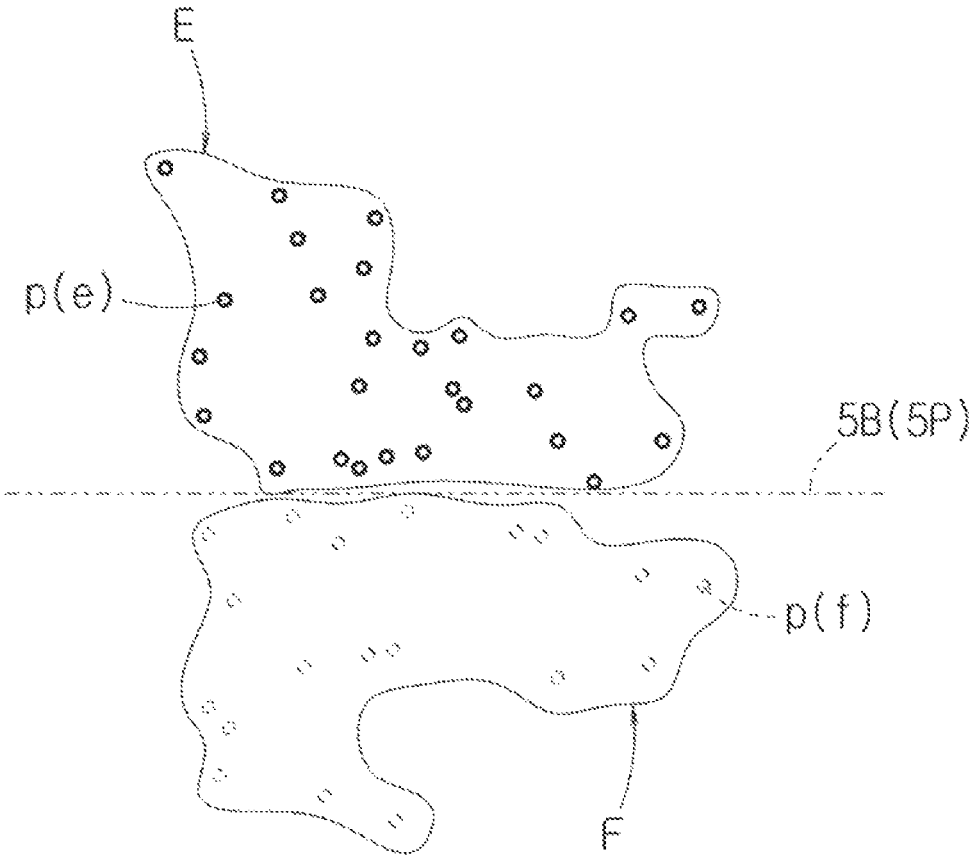
FIG. 5 is a front view visualizing point cloud data in a sample space of FIG. 4.

Now, refer to FIG. 5. FIG. 5 is a view visualizing measuring points p within a sample space S when viewed along the longitudinal direction of the runway 2 in the plan view of FIG. 4. The sample space S is composed of the space above the distant paved surface 5B and the space below the distant paved surface 5B.

As shown in FIG. 5, the extraction unit 16 extracts data for foreign object detection from the point cloud data acquired by the point cloud data acquisition unit 15. Specifically, the extraction unit 16 extracts real image point cloud data e and mirage image point cloud data f about a real image E and a mirage image F, respectively, positioned near the distant paved surface 5B from the point cloud data acquired by the point cloud data acquisition unit 15. In other words, the extraction unit 16 extracts the real image point cloud data e (real image data) about the real image E present on the distant paved surface 5B (paved surface) from the point cloud data (three-dimensional data) acquired by the point cloud data acquisition unit 15. The extraction unit 16 also extracts the mirage image point cloud data f (mirage image data) about the mirage image F corresponding to the real image E from the point cloud data (three-dimensional data) acquired by the point cloud data acquisition unit 15.

In other words, if there is a foreign object left on the distant paved surface 5B, when viewed from the first three-dimensional LiDAR scanner 11P, the real image E and the mirage image F appear near the distant paved surface 5B. The real image E is positioned above the distant paved surface 5B. The mirage image F is an image appearing right below the real image E and positioned in a lower part of the distant paved surface 5B. The real image E and the mirage image F appear to face each other in the vertical direction across the distant paved surface 5B.

The mirage image F is generated by the inferior mirage phenomenon. According to one theory, the inferior mirage occurs when a light path of a laser beam curves downward, forming a projected shape, due to decreasing temperatures as the optical path moves upward from the distant paved surface 5B. This leads to a vertically inverted image of the real image E appearing at a lower part of the distant paved surface 5B. However, according to another theory, the inferior mirage occurs when an angle of incidence of laser light on the distant paved surface 5B exceeds a predetermined value, causing the laser light to undergo total internal reflection on the distant paved surface 5B. This also leads to a vertically inverted image of the real image E appearing at a lower part of the distant paved surface 5B. In either case, the mirage image F is an image that is upside down and reversed from the real image E with the distant paved surface 5B interposed between the mirage image F and the real image E. In this sense, the mirage image F can also be referred to as a reversed image. The real image E and the mirage image F generally appear as symmetrical shapes when viewed from the distant paved surface 5B.

Moreover, the aforementioned mirage image F has the characteristic of appearing at a location far from the first three-dimensional LiDAR scanner 11P. Therefore, the mirage image F is less likely to appear in the vicinity of the nearby paved surface 5A and more likely to appear near the distant paved surface 5B. However, there are cases where the mirage image F may appear in the vicinity of the nearby paved surface 5A as well.

As described above, the extraction unit 16 extracts the real image point cloud data e and the mirage image point cloud data f about the real image E and the mirage image F positioned in the vicinity of the distant paved surface 5B, respectively, from the point cloud data acquired by the point cloud data acquisition unit 15. Therefore, when the extraction unit 16 extracts the real image point cloud data e and the mirage image point obtain data f from the point cloud data, the extraction unit 16 needs to understand the Z-coordinate of the distant paved surface 5B. When the road surface data indicating the Z coordinate of the distant paved surface 5B is previously stored in the HDD 12d, the extraction unit 16 can obtain the Z coordinate of the distant paved surface 5B by reading the road surface data from the HDD 12d. On the other hand, when the road surface data indicating the Z coordinate of the distant paved surface 5B is not previously stored in the HDD 12d, the extraction unit 16 estimates the Z coordinate of the distant paved surface 5B by various methods.

For instance, the extraction unit 16 can estimate the point cloud data about the distant paved surface 5B based on the point cloud data about the nearby paved surface 5A, thereby allowing for the estimation of the Z-coordinate of the distant paved surface 5B. In this case, the extraction unit 16 can align the point cloud data about the nearby paved surface 5A, output from the first three-dimensional LiDAR scanner 11P, with the known three-dimensional shape data of the paved surface 5, thus enabling the estimation of the point cloud data about the distant paved surface 5B. The ICP (Iterative Closest Point) technique can be used for the alignment.

The foreign object detection unit 17 detects a foreign object left on the distant paved surface 5B using the real image point cloud data e and the mirage image point cloud data f. Specifically, it is as follows.

Figure 6:
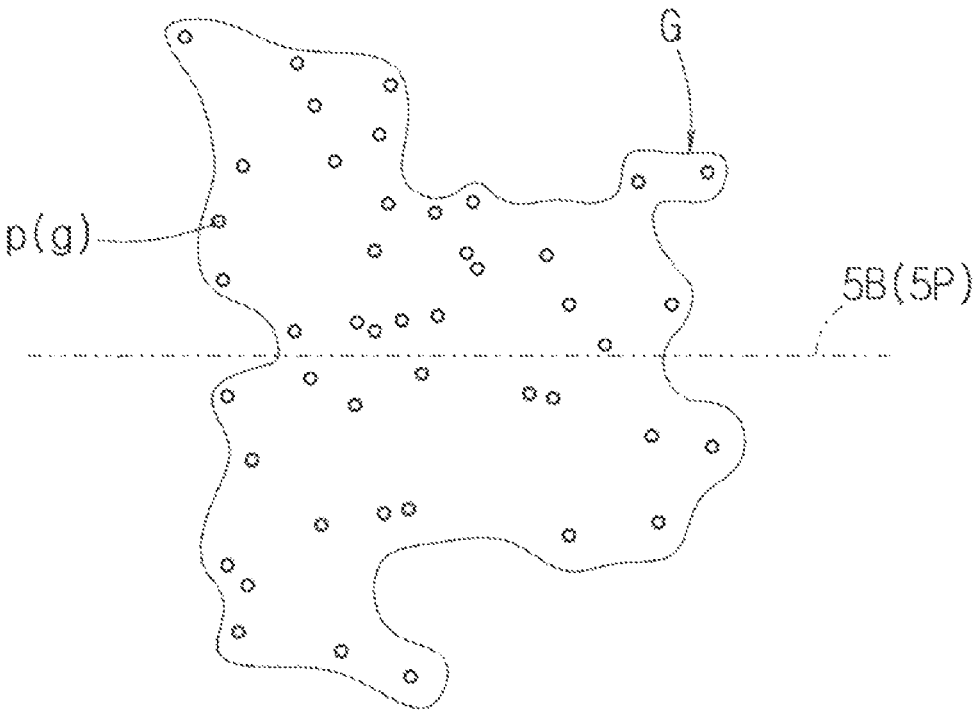
FIG. 6 shows a combined image combining a real image and a mirage image.

As shown in FIGS. 5 and 6, the foreign object detection unit 17 forms a common combined image G from a plurality of measuring points p indicated by the real image point cloud data e and a plurality of measuring points p indicated by the mirage image point cloud data f. In other words, the foreign object detection unit 17 generates the combined image G by combining the real image E and the mirage image F. Then, based on combined image point cloud data g about the combined image G, the foreign object detection unit 17 performs the detection of foreign objects.

Here, the difficulty of detecting a foreign object by the foreign object detection unit 17 will be described. When a small foreign object such as a tool or a part is scanned by the three-dimensional LiDAR scanner 11, the amount of point cloud data about such a small foreign object is small. In addition, when a foreign object left on the distant paved surface 5B is scanned by the first three-dimensional LiDAR scanner 11P, the amount of point cloud data about the foreign object is small. Therefore, when a small foreign object left on the distant paved surface 5B is scanned by the first three-dimensional LiDAR scanner 11P, the amount of point cloud data about the foreign object is very small. The amount of point cloud data is typically the number of measuring points about the foreign object. The foreign object detection unit 17 determines that, only when the number of measuring points constituting a certain image is greater than or equal to a predetermined value, the foreign object corresponding to the certain image is present in order to prevent false detection of a foreign object due to disturbances such as stray light. In contrast, when the number of measuring points constituting a certain image is less than the predetermined value, the foreign object detection unit 17 determines that there is no foreign object corresponding to the certain image. If the foreign object detection unit 17 detects a foreign object only based on the real image point cloud data e shown in FIG. 5, and if the predetermined value is 30, it might classify the real image point cloud data e as noise due to interference and consequently determine that there is no foreign object corresponding to the real image E. Therefore, in this example embodiment, as shown in FIG. 6, the foreign object detection unit 17 generates the combined image G by combining the real image E and the mirage image F, and performs foreign object detection based on the combined image point cloud data g about the combined image G. With this configuration, a larger amount of data is available for foreign object detection, enabling the detection of small foreign objects left on the distant paved surface 5B far from the first three-dimensional LiDAR scanner 11P.

The alarm unit 18, when the foreign object detection unit 17 detects a foreign object, performs foreign object alarm processing. The foreign object alarm processing involves, for example, displaying a detection location of the foreign object on the LCD12e.

Figure 7:
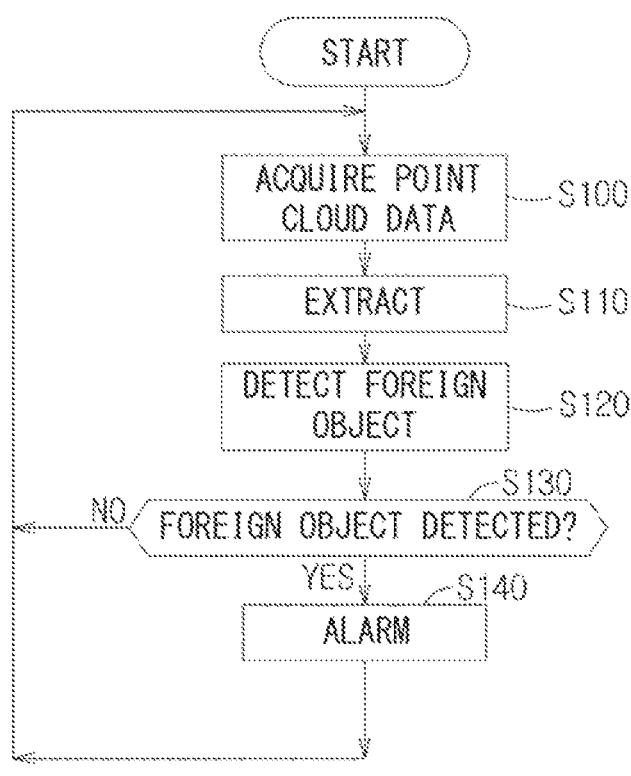
FIG. 7 is an operation flow of the monitoring apparatus.

Next, the operation of the monitoring apparatus 12 will be described with reference to FIG. 7. As shown in FIG. 7, the point cloud data acquisition unit 15 first acquires the point cloud data output from the first three-dimensional LiDAR scanner 11P that scans the paved surface 5 using laser light (S100). Next, the extraction unit 16 extracts the real image point cloud data e and the mirage image point cloud data f from the point cloud data acquired by the point cloud data acquisition unit 15 as data for foreign object detection (S110). Next, the foreign object detection unit 17 detects a foreign object left on the distant paved surface 5B using the real image point cloud data e and the mirage image point cloud data f (S120). When the foreign object detection unit 17 detects a foreign object (S130: YES), the alarm unit 18 executes the foreign object alarm processing (S140) and returns the processing to S100. When the foreign object detection unit 17 does not detect a foreign object (S130: NO), the alarm unit 18 returns the processing to S100 without executing the foreign object alarm processing.

The first example embodiment has been described above. The above example embodiment has the following characteristics.

The monitoring system 10 includes the point cloud data acquisition unit 15 (three-dimensional data acquisition means), the extraction unit 16 (extraction means), and the foreign object detection unit 17 (foreign object detection means). The point cloud data acquisition unit 15 acquires point cloud data (three-dimensional data) output from the first three-dimensional LiDAR scanner 11P (three-dimensional ranging sensor) that scans the first paved surface 5P (paved surface 5) for aircraft using laser light. The extraction unit 16 extracts the real image point cloud data e (real image data) about the real image E present on the distant paved surface 5B (paved surface) from the point cloud data (three-dimensional data) acquired by the point cloud data acquisition unit 15. The extraction unit 16 extracts the mirage image point cloud data f (mirage image data) about the mirage image F corresponding to the real image E from the point cloud data (three-dimensional data) acquired by the point cloud data acquisition unit 15. The foreign object detection unit 17 detects a foreign object left on the first paved surface 5P using the real image point cloud data e and the mirage image point cloud data f. With this configuration, a larger amount of data is available for foreign object detection, resulting in improved detection of foreign objects left on the first paved surface 5P.

In other words, the extraction unit 16 extracts the real point cloud data (real data) e about the real image E and the mirage image data (mirage data) f about the mirage image F positioned in the vicinity of the first paved surface 5P from the point cloud data. The real image E is positioned in an upper part of the first paved surface 5P, while the mirage image F is positioned right below the real image E and in a lower part of the first paved surface 5P.

Moreover, the foreign object detection unit 17 determines that if the number of measuring points constituting one image is greater than or equal to a predetermined value, there is a foreign object corresponding to that image. If the number of measuring points is less than the predetermined value, the foreign object detection unit 17 determines that there is no foreign object corresponding to that image. As shown in FIGS. 5 and 6, the foreign object detection unit 17 forms a single common combined image G using the plurality of measuring points p indicated by the real image point cloud data e and the plurality of measuring points p indicated by the mirage image point cloud data f indicated by the real image point cloud data f, and performs foreign object detection based on this combined image. With this configuration, it becomes possible to detect a foreign object left on the first paved surface 5P even when the amount of data of the real image point cloud data e is small, while preventing false detection of foreign objects.

The first paved surface 5P includes the nearby paved surface 5A which can be measured by the first three-dimensional LiDAR scanner 11P. The first paved surface 5P includes the distant paved surface 5B which is farther from the first three-dimensional LiDAR scanner 11P than the nearby paved surface 5A and which cannot be measured by the first three-dimensional LiDAR scanner 11P. The real image E and the mirage image F are positioned to face each other across the distant paved surface 5B. Thus, since the amount of data corresponding to the foreign object is small at a distance from the first three-dimensional LiDAR scanner 11P, the foreign object detection technique according to this example embodiment is particularly advantageous for detecting a foreign object left on the distant paved surface 5B. However, if a mirage image of a foreign object left on the nearby paved surface 5A appears, the foreign object detection technique according to this embodiment is equally advantageous for detecting a foreign object left on the nearby paved surface 5A.

Second Embodiment

Next, a second example embodiment will be described with reference to FIGS. 8 and 9. Hereinafter, this example embodiment will be described mainly in terms of differences from the above first example embodiment, and repeated descriptions will be omitted.

See FIGS. 5 and 6. In the first example embodiment, the foreign object detection unit 17 combines the real image E and the mirage image F to generate the combined image G, assuming that the plurality of measuring points p indicated by the real image point cloud data e and the plurality of measuring points p indicated by the mirage image point cloud data f constitute the single common combined image G. The foreign object detection unit 17 then performs foreign object detection based on the combined image point cloud data g about the combined image G.

Figure 8:
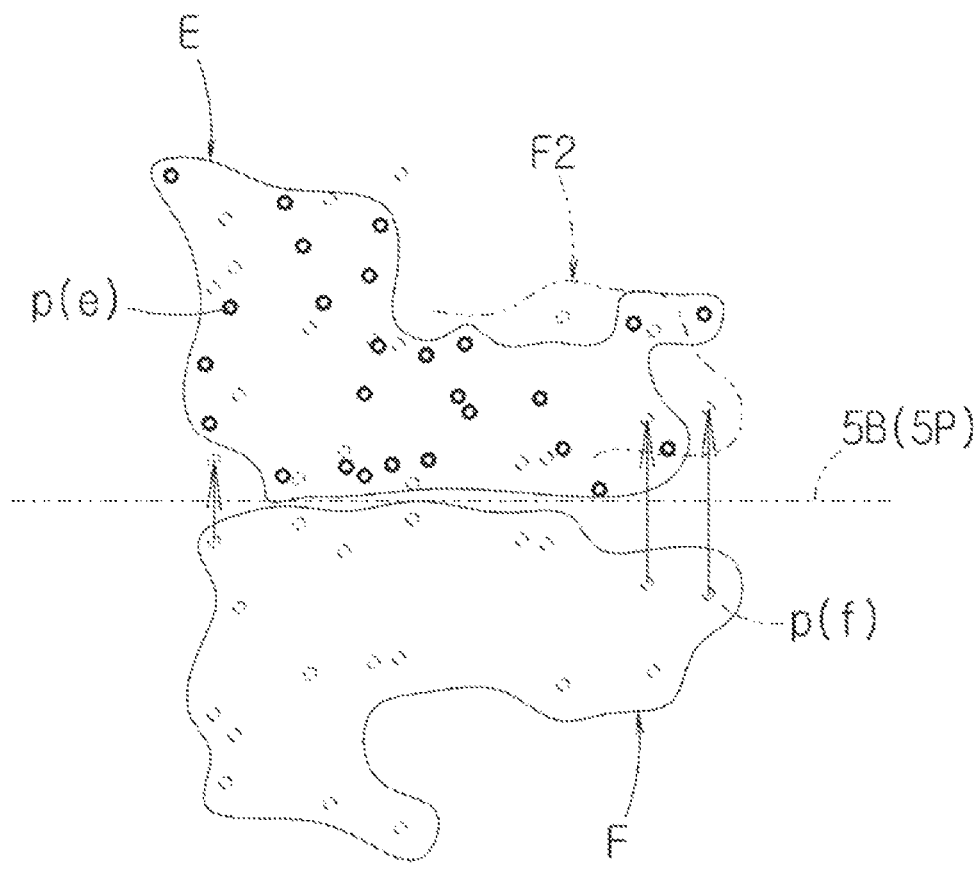
FIG. 8 shows how mirage image point cloud data is inverted vertically.
Figure 9:
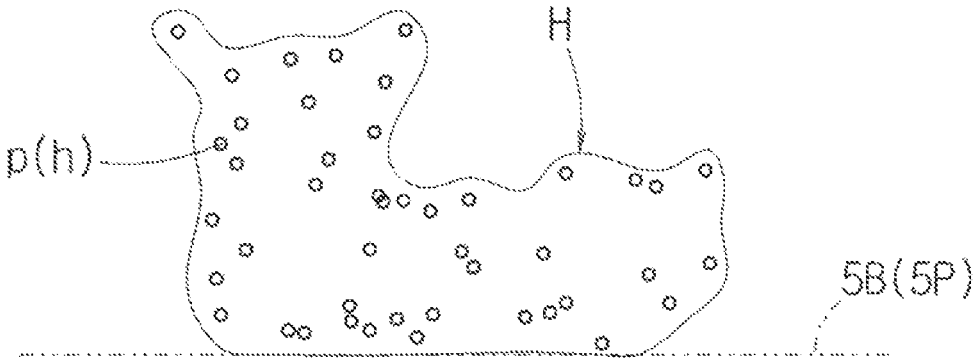
FIG. 9 shows a synthetic image obtained by synthesizing the real image and the mirage image.

In contrast, in this example embodiment, as shown in FIGS. 8 and 9, the foreign object detection unit 17 synthesizes the real image point cloud data e and the mirage image point cloud data f by vertically inverting the mirage image and then superimposing the vertically-inverted mirage image F onto the real image E, thereby generating synthetic point cloud data h. In other words, the foreign object detection unit 17 synthesizes the inverted mirage image F2, obtained by vertically inverting the mirage image F, with the real image E to create a synthetic image H. Next, based on the synthetic point cloud data h, the foreign object detection unit 17 performs the foreign object detection.

Further, when the foreign object detection unit 17 performs detection of the foreign object based on the synthetic point cloud data h, it estimates the type of the detected foreign object based on the synthetic point cloud data h. FIG. 9 shows the synthetic image H formed by the synthetic point cloud data h. As described above, the synthetic image H is a synthetic image of the real image E shown in FIG. 8 and the inverted mirage image F2 which is vertically inverted using the distant paved surface 5B as a symmetric reference plane. That is, the synthetic image H includes both the real image E and the inverted mirage image F2. Therefore, since the synthetic image H more faithfully reproduces the shape of the foreign object than the real image E and the inverted mirage image F2, creating the synthetic image H is highly suitable for estimating the type of the detected foreign object.

Although the second example embodiment has been described above, the second example embodiment has the following characteristics.

That is, the foreign object detection unit 17 synthesizes the real image point cloud data e and the mirage image point cloud data f by vertically inverting the mirage image and then superimposing the vertically-inverted mirage image F onto the real image E, thereby generating synthetic point cloud data h. The foreign object detection unit 17 then performs foreign object detection based on the synthetic point cloud data h. According to the above configuration, the foreign object detection can be performed based only on the measuring points p in the upper part of the distant paved surface 5B.

The foreign object detection unit 17 estimates a type of the detected foreign object based on the synthetic point cloud data h when detecting the foreign object based on the synthetic point cloud data h. That is, since the synthetic image H of the synthetic point cloud data h reproduces the shape of the foreign object more faithfully than the real image E and the inverted mirage image F2, the above configuration contributes to the estimation of the type of the foreign object.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the example embodiments disclosed above can be described as, but not limited to, the following supplementary notes.

Supplementary Note 1

A monitoring system comprising:
three-dimensional data acquisition means for acquiring three-dimensional data output from a three-dimensional ranging sensor for scanning a paved surface for aircraft using laser light;
extraction means for extracting, from the three-dimensional data, real image data about a real image present on the paved surface and mirage image data about a mirage image corresponding to the real image; and
foreign object detection means for detecting a foreign object left on the paved surface using the real image data and the mirage image data.

Supplementary Note 2

The monitoring system according to supplementary note 1, wherein
the three-dimensional ranging sensor is a three-dimensional Lidar scanner,
the three-dimensional data is point cloud data,
the real image data is real image point cloud data, and
the mirage image data is mirage image point cloud data.

Supplementary Note 3

The monitoring system according to supplementary note 2, wherein the foreign object detection means is configured to determine, when the number of measuring points constituting one image is greater than or equal to a predetermined value, that there is a foreign object corresponding to the one image and to determine, when the number of measuring points constituting one image is less than the predetermined value, that there is no foreign object corresponding to the one image, and
the foreign object detection means generates one combined image from a plurality of measuring points indicated by the real image point cloud data and a plurality of measuring points indicated by the mirage image point cloud data and performs the detection of the foreign object.

Supplementary Note 4

The monitoring system according to supplementary note 2, wherein
the foreign object detection means synthesizes the real image point cloud data and the mirage image point cloud data by vertically inverting the mirage image and then superimposing the vertically-inverted mirage image onto the real image, thereby generating synthetic point cloud data, and the foreign object detection means performs detection of the foreign object based on the synthetic point cloud data.

Supplementary Note 5

The monitoring system according to supplementary note 4, wherein the foreign object detection means estimates a type of the detected foreign object based on the synthetic point cloud data when performing the detection of the foreign object based on the synthetic point cloud data.

Supplementary Note 6

The monitoring system according to any one of supplementary claims 1 to 5 wherein
the paved surface comprises:
    a nearby paved surface near the three-dimensional ranging sensor capable of being measured by the three-dimensional ranging sensor; and
    a distant paved surface farther from the three-dimensional ranging sensor than the nearby paved surface and not capable of being measured by the three-dimensional ranging sensor, and
the real image and the mirage image are positioned so as to face each other across the distant paved surface.

Supplementary Note 7

A monitoring apparatus comprising:
three-dimensional data acquisition means for acquiring three-dimensional data output from a three-dimensional ranging sensor for scanning a paved surface for aircraft using laser light;
extraction means for extracting, from the three-dimensional data, real image data about a real image present on the paved surface and mirage image data about a mirage image corresponding to the real image; and
foreign object detection means for detecting a foreign object left on the paved surface using the real image data and the mirage image data.

Supplementary Note 8

The monitoring apparatus according to supplementary note 7, wherein
the three-dimensional ranging sensor is a three-dimensional Lidar scanner,
the three-dimensional data is point cloud data,
the real image data is real image point cloud data, and
the mirage image data is mirage image point cloud data.

Supplementary Note 9

The monitoring apparatus according to supplementary note 8, wherein
the foreign object detection means is configured to determine, when the number of measuring points constituting one image is greater than or equal to a predetermined value, that there is a foreign object corresponding to the one image and to determine, when the number of measuring points constituting one image is less than the predetermined value, that there is no foreign object corresponding to the one image, and
the foreign object detection means generates one combined image from a plurality of measuring points indicated by the real image point cloud data and a plurality of measuring points indicated by the mirage image point cloud data and performs the detection of the foreign object.

Supplementary Note 10

The monitoring apparatus according to supplementary note 8, wherein
the foreign object detection means synthesizes the real image point cloud data and the mirage image point cloud data by vertically inverting the mirage image and then superimposing the vertically-inverted mirage image onto the real image, thereby generating synthetic point cloud data, and
the foreign object detection means performs detection of the foreign object based on the synthetic point cloud data.

Supplementary Note 11

The monitoring apparatus according to supplementary note 10, wherein
the foreign object detection means estimates a type of the detected foreign object based on the synthetic point cloud data when performing the detection of the foreign object based on the synthetic point cloud data.

Supplementary Note 12

The monitoring apparatus according to any one of supplementary notes 7 to 11, wherein
the paved surface comprises:
    a nearby paved surface near the three-dimensional ranging sensor capable of being measured by the three-dimensional ranging sensor;
    a distant paved surface farther from the three-dimensional ranging sensor than the nearby paved surface and not capable of being measured by the three-dimensional ranging sensor; and
the real image and the mirage image are positioned so as to face each other across the distant paved surface.

Supplementary Note 13

A monitoring method executed by a computer, the monitoring method comprising:
acquiring three-dimensional data output from a three-dimensional ranging sensor for scanning a paved surface for aircraft using laser light;
extracting, from the three-dimensional data, real image data about a real image present on the paved surface and mirage image data about a mirage image corresponding to the real image; and
detecting a foreign object left on the paved surface using the real image data and the mirage image data.

Supplementary Note 14

The monitoring method according to supplementary note 13, wherein
the three-dimensional ranging sensor is a three-dimensional Lidar scanner,
the three-dimensional data is point cloud data,
the real image data is real image point cloud data, and
the mirage image data is mirage image point cloud data.

Supplementary Note 15

The monitoring method according to supplementary note 14, wherein in the detection of the foreign object, when the number of measuring points constituting one image is greater than or equal to a predetermined value, it is determined that there is a foreign object corresponding to the one image and when the number of measuring points constituting one image is less than the predetermined value, it is determined that there is no foreign object corresponding to the one image, and in the detection of the foreign object, one combined image is generated from a plurality of measuring points indicated by the real image point cloud data and a plurality of measuring points indicated by the mirage image point cloud data and the detection of the foreign object is performed.

Supplementary Note 16

The monitoring method according to supplementary note 14, wherein in the detection of the foreign object, the real image point cloud data and the mirage image point cloud data are synthesized by vertically inverting the mirage image and then superimposing the vertically-inverted mirage image onto the real image, thereby generating synthetic point cloud data, and the detection of the foreign object is performed based on the synthetic point cloud data.

Supplementary Note 17

The monitoring method according to supplementary note 16, wherein in the detection of the foreign object, a type of the detected foreign object is estimated based on the synthetic point cloud data when performing the detection of the foreign object based on the synthetic point cloud data.

Supplementary Note 18

The monitoring method according to any one of supplementary notes 13 to 17, wherein the paved surface comprises:

a nearby paved surface near the three-dimensional ranging sensor capable of being measured by the three-dimensional ranging sensor; and a distant paved surface farther from the three-dimensional ranging sensor than the nearby paved surface and not capable of being measured by the three-dimensional ranging sensor, and the real image and the mirage image are positioned so as to face each other across the distant paved surface.

Supplementary Note 19

A program for causing a computer to execute:

acquiring three-dimensional data output from a three-dimensional ranging sensor for scanning a paved surface for aircraft using laser light;

extracting, from the three-dimensional data, real image data about a real image present on the paved surface and mirage image data about a mirage image corresponding to the real image; and detecting a foreign object left on the paved surface using the real image data and the mirage image data.

Supplementary Note 20

The program according to supplementary note 19, wherein the three-dimensional ranging sensor is a three-dimensional Lidar scanner, the three-dimensional data is point cloud data, the real image data is real image point cloud data, and the mirage image data is mirage image point cloud data.

Supplementary Note 21

The program according to supplementary note 20, wherein in the detection of the foreign object, when the number of measuring points constituting one image is greater than or equal to a predetermined value, it is determined that there is a foreign object corresponding to the one image and when the number of measuring points constituting one image is less than the predetermined value, it is determined that there is no foreign object corresponding to the one image, and in the detection of the foreign object, one combined image is generated from a plurality of measuring points indicated by the real image point cloud data and a plurality of measuring points indicated by the mirage image point cloud data and the detection of the foreign object is performed.

Supplementary Note 22

The program according to supplementary note 20, wherein in the detection of the foreign object, the real image point cloud data and the mirage image point cloud data are synthesized by vertically inverting the mirage image and then superimposing the vertically-inverted mirage image onto the real image, thereby generating synthetic point cloud data, and the detection of the foreign object is performed based on the synthetic point cloud data.

Supplementary Note 23

The program according to supplementary note 22, wherein in the detection of the foreign object, a type of the detected foreign object is estimated based on the synthetic point cloud data when performing the detection of the foreign object based on the synthetic point cloud data.

Supplementary Note 24

The program according to any one of supplementary notes 19 to 23, wherein the paved surface comprises:

a nearby paved surface near the three-dimensional ranging sensor capable of being measured by the three-dimensional ranging sensor; and a distant paved surface farther from the three-dimensional ranging sensor than the nearby paved surface and not capable of being measured by the three-dimensional ranging sensor, and the real image and the mirage image are positioned so as to face each other across the distant paved surface.

According to the present disclosure, since an amount of data to be used for foreign object detection becomes large, detection of a foreign object left on a paved surface for aircraft is improved.

The first and second example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A monitoring system comprising:

at least one memory storing instructions, and at least one processor configured to execute the instructions to;

acquire three-dimensional data output from a three-dimensional ranging sensor for scanning a paved surface for aircraft using laser light;

extract, from the three-dimensional data, real image data about a real image present on the paved surface and mirage image data about a mirage image corresponding to the real image; and detect a foreign object left on the paved surface using the real image data and the mirage image data.

2. The monitoring system according to claim 1, wherein the three-dimensional ranging sensor is a three-dimensional LiDAR scanner, the three-dimensional data is point cloud data, the real image data is real image point cloud data, and the mirage image data is mirage image point cloud data.

3. The monitoring system according to claim 2, wherein the at least one processor is further configured to execute the instructions to determine, when the number of measuring points constituting one image is greater than or equal to a predetermined value, that there is a foreign object corresponding to the one image and to determine, when the number of measuring points constituting one image is less than the predetermined value, that there is no foreign object corresponding to the one image, and the at least one processor is further configured to execute the instructions to generate one combined image from a plurality of measuring points indicated by the real image point cloud data and a plurality of measuring points indicated by the mirage image point cloud data and performs the detection of the foreign object.

4. The monitoring system according to claim 2, wherein the at least one processor is further configured to execute the instructions to synthesize the real image point cloud data and the mirage image point cloud data by vertically inverting the mirage image and then superimposing the vertically-inverted mirage image onto the real image, thereby generating synthetic point cloud data, and the at least one processor is further configured to execute the instructions to perform detection of the foreign object based on the synthetic point cloud data.

5. The monitoring system according to claim 4, wherein the at least one processor is further configured to execute the instructions to estimate a type of the detected foreign object based on the synthetic point cloud data when performing the detection of the foreign object based on the synthetic point cloud data.

6. The monitoring system according to claim 1, wherein the paved surface comprises:

a nearby paved surface near the three-dimensional ranging sensor capable of being measured by the three-dimensional ranging sensor; and a distant paved surface farther from the three-dimensional ranging sensor than the nearby paved surface and not capable of being measured by the three-dimensional ranging sensor, and the real image and the mirage image are positioned so as to face each other across the distant paved surface.

7. A monitoring method executed by a computer, the monitoring method comprising:

acquiring three-dimensional data output from a three-dimensional ranging sensor for scanning a paved surface for aircraft using laser light;

extracting, from the three-dimensional data, real image data about a real image present on the paved surface and mirage image data about a mirage image corresponding to the real image; and detecting a foreign object left on the paved surface using the real image data and the mirage image data.

8. The monitoring method according to claim 7, wherein the three-dimensional ranging sensor is a three-dimensional Lidar scanner, the three-dimensional data is point cloud data, the real image data is real image point cloud data, and the mirage image data is mirage image point cloud data.

9. The monitoring method according to claim 8, wherein in the detection of the foreign object, when the number of measuring points constituting one image is greater than or equal to a predetermined value, it is determined that there is a foreign object corresponding to the one image and when the number of measuring points constituting one image is less than the predetermined value, it is determined that there is no foreign object corresponding to the one image, and in the detection of the foreign object, one combined image is generated from a plurality of measuring points indicated by the real image point cloud data and a plurality of measuring points indicated by the mirage image point cloud data and the detection of the foreign object is performed.

10. The monitoring method according to claim 8, wherein in the detection of the foreign object, the real image point cloud data and the mirage image point cloud data are synthesized by vertically inverting the mirage image and then superimposing the vertically-inverted mirage image onto the real image, thereby generating synthetic point cloud data, and the detection of the foreign object is performed based on the synthetic point cloud data.

11. The monitoring method according to claim 10, wherein in the detection of the foreign object, a type of the detected foreign object is estimated based on the synthetic point cloud data when performing the detection of the foreign object based on the synthetic point cloud data.

12. The monitoring method according to claim 7, wherein the paved surface comprises:

a nearby paved surface near the three-dimensional ranging sensor capable of being measured by the three-dimensional ranging sensor; and a distant paved surface farther from the three-dimensional ranging sensor than the nearby paved surface and not capable of being measured by the three-dimensional ranging sensor, and the real image and the mirage image are positioned so as to face each other across the distant paved surface.

* * * * *